US012166793B2

(12) United States Patent
Jain

(10) Patent No.: US 12,166,793 B2
(45) Date of Patent: Dec. 10, 2024

(54) FACILITATING EFFICIENT INTRUSION DETECTION VIA HIERARHICAL SIGNATURES

(71) Applicant: MICROSOFT TECHNOLOGY LICENSING, LLC, Redmond, WA (US)

(72) Inventor: Ankit Jain, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 17/664,755

(22) Filed: May 24, 2022

(65) Prior Publication Data

US 2022/0417282 A1    Dec. 29, 2022

(30) Foreign Application Priority Data

Jun. 23, 2021   (IN) .............................. 202141028191

(51) Int. Cl.
    H04L 9/40          (2022.01)
(52) U.S. Cl.
    CPC ...... H04L 63/1466 (2013.01); H04L 63/1416 (2013.01)
(58) Field of Classification Search
    CPC .................... H04L 63/1466; H04L 63/1416
    See application file for complete search history.

(56) References Cited

U.S. PATENT DOCUMENTS

| 6,347,376 B1* | 2/2002 | Attwood ............. H04L 63/0263 726/1 |
| 6,567,408 B1* | 5/2003 | Li ....................... H04L 63/0263 370/395.31 |

(Continued)

FOREIGN PATENT DOCUMENTS

WO    2009128881 A1    10/2009

OTHER PUBLICATIONS

He, et al., "Improving Cloud network security using the Tree-Rule Firewall", In the Journal of Future generation computer systems, vol. 30, Jan. 1, 2014, pp. 116-126.

(Continued)

Primary Examiner — Darren B Schwartz
(74) Attorney, Agent, or Firm — Shook, Hardy & Bacon L.L.P.

(57) ABSTRACT

Methods and systems are provided for facilitating efficient intrusion detection via hierarchical signatures, in accordance with embodiments described herein. In particular, embodiments described herein include obtaining an intrusion signature that includes an intrusion attribute value(s) indicating a malicious attack on a computer network or system. Based on the intrusion signature, a hierarchical signature is generated by including the intrusion attribute value(s) of the intrusion signature in one of a corresponding data structure of hierarchical data structures. Thereafter, a network packet, having a data attribute(s) is obtained. The network packet is determined as suspect of being malicious based on the data attribute(s) of the network packet matching the at intrusion attribute value(s) of the hierarchical signature. The indication of the suspect network packet can be provided, for example for notification of such a suspect network packet.

20 Claims, 9 Drawing Sheets

(56) References Cited

U.S. PATENT DOCUMENTS

| | | | | |
|---|---|---|---|---|
| 8,112,800 | B1* | 2/2012 | Yang | H04L 63/0245 726/22 |
| 2004/0030424 | A1* | 2/2004 | Corl, Jr. | H04L 63/0263 700/90 |
| 2004/0133672 | A1* | 7/2004 | Bhattacharya | H04L 63/1416 709/224 |
| 2004/0250124 | A1* | 12/2004 | Chesla | G06F 21/552 709/224 |
| 2004/0258043 | A1* | 12/2004 | Engbersen | H04L 63/0272 370/392 |
| 2005/0015622 | A1* | 1/2005 | Williams | H04L 63/20 726/4 |
| 2005/0114655 | A1* | 5/2005 | Miller | H04L 63/0263 713/163 |
| 2006/0195896 | A1* | 8/2006 | Fulp | H04L 63/0218 726/13 |
| 2007/0016946 | A1* | 1/2007 | Gouda | H04L 63/0263 726/11 |
| 2007/0283144 | A1* | 12/2007 | Kramer | H04L 63/0263 713/164 |
| 2009/0262659 | A1* | 10/2009 | Sturges | H04L 63/1416 370/253 |
| 2011/0055916 | A1* | 3/2011 | Ahn | G06F 21/562 726/13 |
| 2014/0089498 | A1* | 3/2014 | Goldfarb | H04L 63/0263 709/224 |
| 2015/0007312 | A1* | 1/2015 | Pidathala | H04L 63/1433 726/22 |
| 2015/0113646 | A1* | 4/2015 | Lee | H04L 63/1408 726/23 |
| 2016/0127401 | A1* | 5/2016 | Chauhan | H04L 63/0218 726/13 |
| 2017/0103201 | A1* | 4/2017 | Fox | H04L 63/20 |
| 2017/0289180 | A1* | 10/2017 | Zheng | H04L 63/1416 |
| 2018/0054418 | A1* | 2/2018 | El Defrawy | H04L 63/10 |
| 2019/0303385 | A1* | 10/2019 | Ching | H04L 63/1433 |
| 2024/0129323 | A1* | 4/2024 | Garyani | H04L 63/1425 |

OTHER PUBLICATIONS

Kruegel, et al., "Using Decision Trees to Improve Signature-Based Intrusion Detection", In the International workshop on Recent Advances in Intrusion Detection, Sep. 8, 2003, pp. 173-191.

"International Search Report and Written Opinion Issued in PCT Application No. PCT/US22/030461", Mailed Date: Sep. 8, 2022, 13 Pages.

"Firewalls and Intrusion Detection Systems", Retrieved From: https://www.youtube.com/watch?v=2YGUvopGkQc, May 17, 2012, 6 Pages.

"Linux/Cdorked.A: New Apache backdoor being used in the wild to serve Blackhole", Retrieved From: https://www.welivesecurity.com/2013/04/26/linuxcdorked-new-apache-backdoor-in-the-wild-serves-blackhole/, Apr. 26, 2013, 21 Pages.

"Snort 3.0 is here!", Retrieved From: https://web.archive.org/web/20220630161623/https://www.snort.org/, Jun. 30, 2022, 12 Pages.

"The netfilter.org "libnetfilter_queue" project", Retrieved From: https://web.archive.org/web/20220412015351/https://www.netfilter.org/projects/libnetfilter_queue/, Apr. 12, 2022, 2 Pages.

"Using NFQUEUE and libnetfilter_queue", Retrieved From: https://web.archive.org/web/20220602113249/https://home.regit.org/netfilter-en/using-nfqueue-and-libnetfilter_queue/, Jun. 2, 2022, 14 Pages.

Abuhmed, et al., "A Survey on Deep Packet Inspection for Intrusion Detection Systems", In Repository of arXiv:0803.0037v1, Mar. 1, 2008, 10 Pages.

Attig, et al., "SIFT: Snort Intrusion Filter for TCP", In Proceedings of 13th Symposium on High Performance Interconnects, Aug. 17, 2005, 7 Pages.

Hinaif, et al., "Parallel Quick Search Algorithm to Speed Packet Payload Filtering in NIDS", In Journal of Engineering Science and Technology, vol. 4, Issue 2, Jun. 2009, pp. 220-230.

Hodigere, Arun, "Intrusion Detection System", Retrieved From: https://view.officeapps.live.com/op/view.aspx?src=https%3A%2F%2Fwww.cs.utexas.edu%2Fusers%2Fygz%2F395T-01F%2Freading%2Farun.opt&wdOrigin=BROWSELINK, May 31, 2014, 26 Pages.

JCMcIntyre, "Using Snort for intrusion detection", Retrieved From: https://www.techrepublic.com/article/using-snort-for-intrusion-detection/, Aug. 22, 2001, 17 Pages.

Joseph, et al., "Efficient String Matching FPGA for speed up Network Intrusion Detection", In International Journal of Applied Mathematics & Information Sciences, vol. 12, Issue 2, Mar. 1, 2018, pp. 397-404.

Le, et al., "A Memory-Efficient and Modular Approach for Large-Scale String Pattern Matching", In Journal of IEEE Transactions on Computers, vol. 62, Issue 5, May 2013, pp. 844-857.

Lim, et al., "Hierarchical Binary Search Tree for Packet Classification", In Journal of IEEE Communications Letters, vol. 11, Issue 8, Aug. 20, 2007, pp. 689-691.

Lim, et al., "High-Speed Packet Classification Using Binary Search on Length", In Proceedings of the 3rd ACM/IEEE Symposium on Architecture for Networking and Communications System, Dec. 3, 2007, pp. 137-144.

Mehrotra, et al., "Binary Search Schemes for Fast IP Lookups", In Proceedings of Global Telecommunications Conference, Nov. 17, 2002, pp. 2005-2009.

Scarfone, et al., "Guide to Intrusion Detection and Prevention Systems (IDPS)", In NIST special publication 800 (2007), Feb. 20, 2007, 127 Pages.

Shah, et al., "Performance Comparison of Intrusion Detection Systems and Application of Machine Learning to Snort System", In Journal of Future Generation Computer Systems, vol. 80, Mar. 1, 2018, 25 Pages.

Shiri, et al., "A Parallel Technique for Improving the Performance of Signature-Based Network Intrusion Detection System", In Proceedings of IEEE 3rd International Conference on Communication Software and Networks, May 27, 2011, pp. 692-696.

Song, et al., "Efficient Packet Classification for Network Intrusion Detection using FPGA", In Proceedings of the Acm/ Sigda 13th International Symposium on Field-programmable Gate Arrays, Feb. 20, 2005, 8 Pages.

Suresh, et al., "Efficient pattern matching algorithm for security and Binary Search Tree (BST) based memory system in Wireless Intrusion Detection System (WIDS)", In Journal of Computer Communications, vol. 151, Feb. 1, 2020, pp. 111-118.

Vasiliadis, et al., "Gnort: High Performance Network Intrusion Detection Using Graphics Processors", In Proceedings of the 11th International Symposium on Recent Advances in Intrusion Detection, Sep. 15, 2008, 19 Pages.

Yang, et al., "High Performance Dictionary-Based String Matching for Deep Packet Inspection", In Proceedings of IEEE INFOCOM, Mar. 14, 2010, 5 Pages.

Yoshioka, Atsushi, "Rule Hashing for Efficient Packet Classification in Network Intrusion Detection", In Dissertation Submitted to Washington State University for the Degree of Master of Science in Computer Science, Dec. 2007, 53 Pages.

Yu, et al., "Efficient Multi-Match Packet Classification with TCAM", In Proceedings of 12th Annual IEEE Symposium on High Performance Interconnects, Aug. 27, 2004, pp. 28-34.

Zhang, et al., "Optimization of Traditional Snort Intrusion Detection System", In Proceedings of IOP Conference Series Materials Science and Engineering, vol. 569, Issue 4, Jul. 1, 2019, 8 Pages.

\* cited by examiner

FACILITATING EFFICIENT INTRUSION DETECTION VIA HIERARHICAL SIGNATURES

CROSS-REFERENCE SECTION

This Application claims priority to Indian Patent Application No. 202141028191, filed on Jun. 23, 2021, the contents of which is hereby incorporated by reference in its entirety.

BACKGROUND

Attackers may use intrusive or malicious communications in an attempt to penetrate a system, service, or device. For example, an attacker may initiate a communication related to scanning attacks, asymmetric routing, buffer overflow attacks, protocol-specific attacks (e.g., in association with ICMP, TCP, ARP), malware (e.g., worms, trojans, viruses, bots), traffic flooding, (e.g., distributed denial of service (DdoS) attack), etc. Such attacks can enable unauthorized access to systems, services, and devices, resulting in risks to both a user and the entity associated with the system, service, or device. As such, identifying these attacks is important to protect security of such systems, services, and devices.

Intrusion detection systems are frequently used to monitor or detect suspicious activities. One conventional intrusion detection system includes a signature-based approach that utilizes signatures to identify suspicious activity. A conventional signature-based approach is generally designed to match certain parameters and content of packets with an attack database, generally defined by users of an intrusion detection system. Utilizing more useful signatures results in a more secure intrusion detection system. However, increasing the number of signatures can result in an increased number of false positives and an increased utilization of resources to identify whether communications are malicious.

SUMMARY

Accordingly, embodiments of the present disclosure are directed to facilitating efficient intrusion detection using hierarchical signatures. In this regard, an optimized approach for packet scanning in a signature-based intrusion detection system is performed to control any reductions in network speed. Using the enhanced signature-based intrusion detection implementation described herein, the accuracy level of intrusion detection remains high, while also decreasing resource utilization and increasing network throughput. In particular, using a hierarchical signature-based approach enables a more efficient detection of suspect communications as only relevant portions of signatures are analyzed. In this regard, at each level of the hierarchy, only unique values that correspond with the previous sequence of attributes are analyzed, resulting in a more efficient analysis. Further, the unique values can be arranged in a sorted array enabling a more efficient binary search to be performed in an effort to identify a match of a signature attribute with an attribute in a communication.

In operation, intrusion signatures indicating intrusive or malicious communications are obtained and preprocessed. In this regard, intrusion signatures are preprocessed to generate hierarchical signatures for use in intrusion detection. As described herein, the hierarchical signatures generally refer to the intrusion signatures arranged in a hierarchical form, with each level of the hierarchy having any number of data structures or arrays corresponding with a different type of attribute (e.g., source IP address, destination IP address, pattern, source port, destination port, action, etc.). Each unique value in an array corresponds with a particular subsequent array. Accordingly, an array for a particular attribute type may include unique values associated with the attribute type and a pointer to a corresponding array associated with another attribute type at a next hierarchical level (e.g., by maintaining hash objects or key-value pairs at each hiearchical level). Such preprocessing of intrusion signatures can occur prior to scanning of communications, such as network packets, to enable a more efficient packet scanning.

Thereafter, as communications are monitored on the network, such as an incoming or outgoing network packet, the hierarchical signatures, or the set of hierarchical data structures, are used to identify whether any signature matches the communication. In embodiments, such a matching process can occur in a sequence corresponding with the levels of the hierarchy structures. To this end, implementations described herein include a level-by-level approach to traverse a hierarchical set of data structures (e.g., arrays) using information, hash objects, or pointers, that point to a particular data structure at the next hierarchical level. As such, upon obtaining a match at a first level of a hierarchy, a corresponding data structure, or array, at a second level of the hierarchy can be analyzed to determine whether a match exists for that attribute. In some cases, at each hierarchy level, a binary search algorithm may be performed to more efficiently identify attribute value matches within a data structure having unique values in a sorted order. As the height, or number of levels, of the hierarchy equals a particular number of attributes (e.g., in a set of intrusion signatures), a logarithmic approach is employed resulting a shorter communication processing time of O (n*log m).

DETAILED DESCRIPTION

Figure 1:
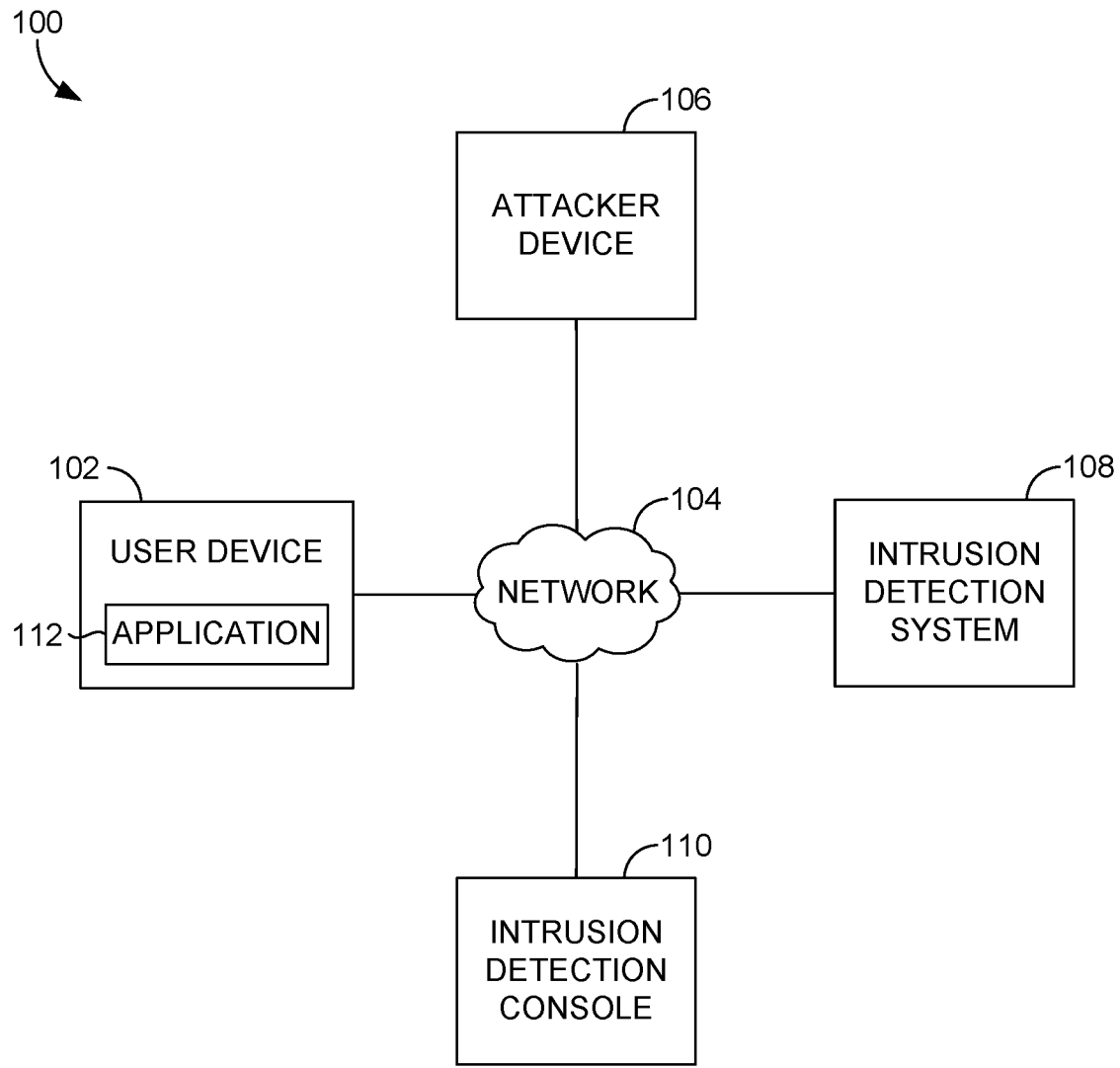
FIG. 1 depicts a diagram of an environment in which one or more embodiments of the present disclosure can be practiced, in accordance with various embodiments of the present disclosure.

Intrusion detection systems are frequently used to monitor or detect suspicious activities. In particular, network security software is used to identify intrusive or malicious activities. Generally, intrusion is an attempt to gain entry or access to a system or network by an unauthorized party or an attempt to disrupt a normal operation(s) of a system or network.

At a high level, intrusion detection systems typically identify intrusive or malicious activities based on an assumption that an intruder's behavior will be noticeably different from the behavior of a normal user. In accordance with detecting suspicious activities, various actions may be implemented. As one example, an alert regarding the suspicious activity may be provided, for example to a security operations center analyst or incident responder. Such an analyst or responder can then investigate the issue and take any appropriate action to remediate the threat. Some other examples of actions that may be performed in association with detecting suspicious activity include configuring a firewall to block an IP address of an intruder, launching a separate program to handle malicious activity, saving packets in a file for further analysis, terminating TCP session to force a connection to terminate (e.g., by forging a TCP FIN packet), etc.

Intrusion detection systems may be implemented via different approaches. One conventional approach uses monitoring of previous network traffic to identify anomalies in traffic. Any unusual or uncommon activity can be identified as intrusive activity. Such anomalies can be identified by comparing ongoing activity against a baseline profile, or normal behavior, for example, defined by a user or automatically generated based on previous activities (e.g., of a particular user). For example, assume an email account is historically accessed in one country. Now assume that the email account is accessed in another country. Based on this anomaly, the account holder may be notified of the email account access. It can be difficult, however, to build an accurate model of "normal" behavior and, as such, this approach often results in false positives and/or false negatives.

Another conventional approach to identify intrusive activity includes a signature-based approach that utilizes signatures to identify suspicious activity. A conventional signature-based approach is designed to match certain parameters and content of packets with an attack database, generally defined by users of an intrusion detection system. For example, a signature-based approach may look for a particular string "root" and IP addresses, as an indicator of accessing root user through telnet from a specific IP address. Such a signature-based approach works by matching user-defined signatures in an attack database with packet parameters. Utilizing more useful signatures results in a more secure intrusion detection system, but also results in false positives and, as such, may provide alerts on packets that are not malicious.

With the conventional signature-based approach, packet scanning occurs to process the packets to identify intrusive packets. Performing packet scanning for all incoming and outgoing packets in the network is time consuming and drastically reduces network speed. Further, to identify whether a packet is malicious or not, the conventional signature-based approach is used to attempt to match each packet with all available signatures, which can be time consuming. As packet scanning can take O ($n*m$) time, where n is number of packets in network and m is number of signatures defined in attack database, the process becomes even more time consuming as the number of signatures m increases. In particular, as a signature-based intrusion detection system's usefulness depends on its attack database, in which attack patterns or signatures are defined, new attack signatures are frequently added to an attack database (e.g., as malware or other malicious content is identified). As such, with the extensive number of attack signatures, packet scanning is very time consuming and resource intensive, thereby decreasing network speed.

Accordingly, embodiments of the present technology are directed to performing an enhanced signature-based approach in which intrusion detection is performed in an efficient and effective manner. In this regard, an optimized approach for packet scanning in a signature-based intrusion detection system is performed to control any reductions in network speed. Using the enhanced signature-based intrusion detection implementation described herein, the accuracy level of intrusion detection remains high, while also decreasing resource utilization and increasing network throughput.

In particular, a hierarchical signature-based approach is used for packet scanning. Using a hierarchical signature-based approach enables a more efficient detection of suspect communications as only relevant portions of signatures are analyzed. For example, assume an incoming communication includes a first attribute value associated with a first type of attribute and a second attribute value associated with a second type of attribute. Instead of comparing such attributes to each signature in an attack database (as with conventional implementations), a first sorted array having unique values associated with the first type of attribute is used to identify a match with the first attribute value (e.g., via a binary search algorithm). Thereafter, a second sorted array that corresponds with the first attribute value is used to identify a match with the second attribute value. As such, at each level of the hierarchy, only unique values that correspond with the previous sequence of attributes are analyzed, resulting in a more efficient analysis. As such, the hierarchical signature-based approach described herein can scan n packets with m signatures in O ($n*\log m$) time, thereby decreasing resource utilization and increasing network throughput. Accordingly, suspect communications can be more quickly acted on and increase network security.

In operation, intrusion signatures indicating intrusive or malicious communications are obtained and preprocessed. In this regard, intrusion signatures, for example provided by users, are preprocessed to generate hierarchical signatures for use in intrusion detection. As described herein, the hierarchical signatures generally refer to the intrusion signatures arranged in a hierarchical form, with each level of the hierarchy having any number of data structures or arrays corresponding with a different type of attribute (e.g., source IP address, destination IP address, pattern, source port, destination port, action, etc.). Each unique value in an array corresponds with a particular subsequent array. For example, assume a first array corresponds with various source IP addresses. A first unique value in the source IP address array corresponds with, or points to, a second array associated with destination IP addresses, while a second unique value in the source IP address array corresponds with, or points to, a third array associated with destination IP addresses. Accordingly, an array for a particular attribute type may include unique values associated with the attribute type and a pointer to a corresponding array associated with another attribute type at a next hierarchical level (e.g., by maintaining hash objects or key-value pairs at each hiearchical level). Such preprocessing of intrusion signatures can occur prior to scanning of communications, such as network packets, to enable a more efficient packet scanning.

Thereafter, as communications are monitored on the network, such as an incoming or outgoing network packet, the hierarchical signatures, or the set of hierarchical data structures, are used to identify whether any signature matches the communication. In embodiments, such a matching process can occur in a sequence corresponding with the levels of the hierarchy structures. To this end, implementations described herein include a level-by-level approach to traverse a hierarchical set of data structures (e.g., arrays) using information, hash objects, or pointers, that point to a particular data structure at the next hierarchical level. As such, upon obtaining a match at a first level of a hierarchy, a corresponding data structure, or array, at a second level of the hierarchy can be analyzed to determine whether a match exists for that attribute. In some cases, at each hierarchy level, a binary search algorithm may be performed to more efficiently identify attribute value matches within a data structure having unique values in a sorted order. As the height, or number of levels, of the hierarchy equals a particular number of attributes (e.g., in a set of intrusion signatures), a logarithmic approach is employed resulting a shorter communication processing time of O (n*log m). In accordance with detecting a suspect communication, or a network packet, an action may be performed such as block, alert, allow or modify action. Advantageously, intrusive communications can be efficiently identified and/or utilized to defend against intrusive or malicious activities.

Turning to FIG. 1, FIG. 1 depicts an example configuration of an operating environment 100 in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 100 shown in FIG. 1 is an example of one suitable operating environment. Among other components not shown, operating environment 100 includes a number of devices, such as user device 102, attacker device 106, instruction detection system 108, and intrusion detection console 110. Each of the components shown in FIG. 1 may be implemented via any type of computing device, such as one or more of computing device 900 described in connection to FIG. 9, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, attacker devices, intrusion detection systems, intrusion detection consoles, and other components may be employed within operating environment 100 within the scope of the present disclosure. Each may comprise a single device or multiple devices cooperating in a distributed environment.

User device 102 can be any type of computing device capable of being operated in an effort to communicate (e.g., with other user devices, servers, etc.) via a network 104. For example, in some implementations, user device is the type of computing device described in relation to FIG. 9. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device can include one or more processors, and one or more computer-readable media. The computer-readable media may include computer-readable instructions executable by the one or more processors. The instructions may be embodied by one or more applications, such as application 112 shown in FIG. 1. Application 112 is referred to as a single application for simplicity, but its functionality can be embodied by one or more applications in practice. As indicated above, the other user devices can include one or more applications similar to application 112.

The application 112 may generally be any application capable of facilitating the exchange of information between the user device and various sources (e.g., other user devices, servers, etc.). Generally, a user device refers to a client device being able to communicate to other devices via a network. In some implementations, the application comprises a web application, which can run in a web browser, and could be hosted at least partially on the server-side of environment 100. In addition, or instead, the application can comprise a dedicated application, such as a mobile application. In some cases, the application is integrated into the operating system (e.g., as a service). It is therefore contemplated herein that "application" be interpreted broadly.

In accordance with embodiments herein, the application 112 can facilitate communication with other devices or servers. For example, the application 112 may communicate with a server that provides content via the application 112. For example, such a server may host a web site, host an application (e.g., mobile or web application), or the like. As another example, the application 112 may communicate with other user devices (e.g., via an electronic communication system, etc.) As can be appreciated, the user device 102, and/or application 112 associated therewith may communicate with any number and type of devices, servers, etc.

The attacker device 106 generally refers to a device that provides an intrusive or malicious communication. An intrusive or malicious communication generally refers to a communication corresponding with an unauthorized access to data or an automated information system. An intrusive or malicious communication may be any communication facilitating an attempt to penetrate a system, service, or device, for example via a user device such as user device 102. Examples of intrusive communications may include communications related to scanning attacks, asymmetric routing, buffer overflow attacks, protocol-specific attacks (e.g., in association with ICMP, TCP, ARP), malware (e.g., worms, trojans, viruses, bots), traffic flooding, (e.g., distributed denial of service (DdoS) attack), etc. An attacker device may be any type of device, including client devices, servers, etc. Such an attacker device may be operated by an individual or entity (e.g., with malicious intent or unknowingly initiating an intrusive communication).

The intrusion detection system 108 generally refers to a system for detecting intrusive or malicious communications, for example, communicated from attacker device 106 and directed to another device, such as user device 102. Although illustrated as a single component, intrusion detection system 108 may include any number of components, servers, cluster of servers, etc. to perform functionality described herein. Intrusion detection system 108 includes one or more processors, and one or more computer-readable media. The computer-readable media includes computer-readable instructions executable by the one or more processors. The instructions may optionally implement one or more components of intrusion detection system 108, described in additional detail below with respect to intrusion detection system 208 of FIG. 2.

It should be appreciated that intrusion detection system 108 may be provided via multiple devices arranged in a distributed environment that collectively provide the functionality described herein. Additionally, other components not shown may also be included within the distributed environment. In addition, or instead, intrusion detection system 108 can be integrated, at least partially, into another device, such as user device 102.

In operation, as an intrusive or malicious communication (e.g., network packet) traverses through a network(s), the intrusion detection system 108 may analyze the communication and identify or determine whether the communication is suspect as being intrusive or malicious. In this regard, the intrusion detection system 108 is generally configured to analyze communications incoming or outgoing to a system or device (e.g., an attacker device, a user device, etc.). In cases in which a communication is identified as suspect, an appropriate action maybe initiated. Such an action may include, for example, providing an intrusive communication notification to an intrusion detection console 110. The intrusion detection console 110 may be operated, for instance, by an analyst which can analyze the data and/or take a further action.

As can be appreciated, the intrusion detection system 108 may be positioned at various locations within the operating environment 100. An intrusion detection system(s) 108 may generally be deployed or placed at strategic points throughout a network (e.g., a LAN network associated with user device 102) at which network traffic is most likely to be vulnerable to an attack. An intrusion detection system 108 may be positioned within the network at any location (e.g., either side of a firewall). As one example, an intrusion detection system resides within a local area network as part of the network infrastructure and can monitor communication packets received via the Internet. In some cases, an intrusion detection system 108 may reside within a network, for example, in association with an Ethernet interface, a router, or a switch (e.g., via a monitor or mirror port). In this way, the intrusion detection system 108 can monitor network traffic as the network traffic traverses a network component. Although only illustrated as a single intrusion detection system 108, a network may include multiple intrusion detection systems located at various locations. Further, in some cases, multiple intrusion detection systems may be located at a same location and thereby analyze different communications in parallel.

Although generally described herein as network-based intrusion detection systems that monitors network traffic, in some embodiments, the technology described herein may be employed within a host-based intrusion detection system that monitors actions and files on host devices. Generally, a host-based intrusion detection system can detect internal changes (e.g., a virus downloaded by an employee and spreading within a system). A host-based intrusion detection system can run on various devices in a network with access to the Internet and other parts of an enterprise network.

Upon detecting a suspect communication (e.g., network packet), the intrusion detection system 108 can initiate an action in association with the suspect communication. As one example, the intrusion detection system 108 may provide a suspect communication notification to the intrusion detection console 110. A suspect or suspicious communication notification provides a notification or alert regarding a suspect communication. In some cases, the intrusion detection console 110 may analyze the notification. Additionally or alternatively, the intrusion detection console may provide an indication of such a notification via a display screen such that an analyst or administrator may view the suspect communication, or information associated therewith. As such, an analyst or administrator may take an appropriate action in response to the detected suspect communication. Other examples of actions that may be initiated include blocking the communication from being delivered and modifying the communication to remove a threat.

Figure 2:
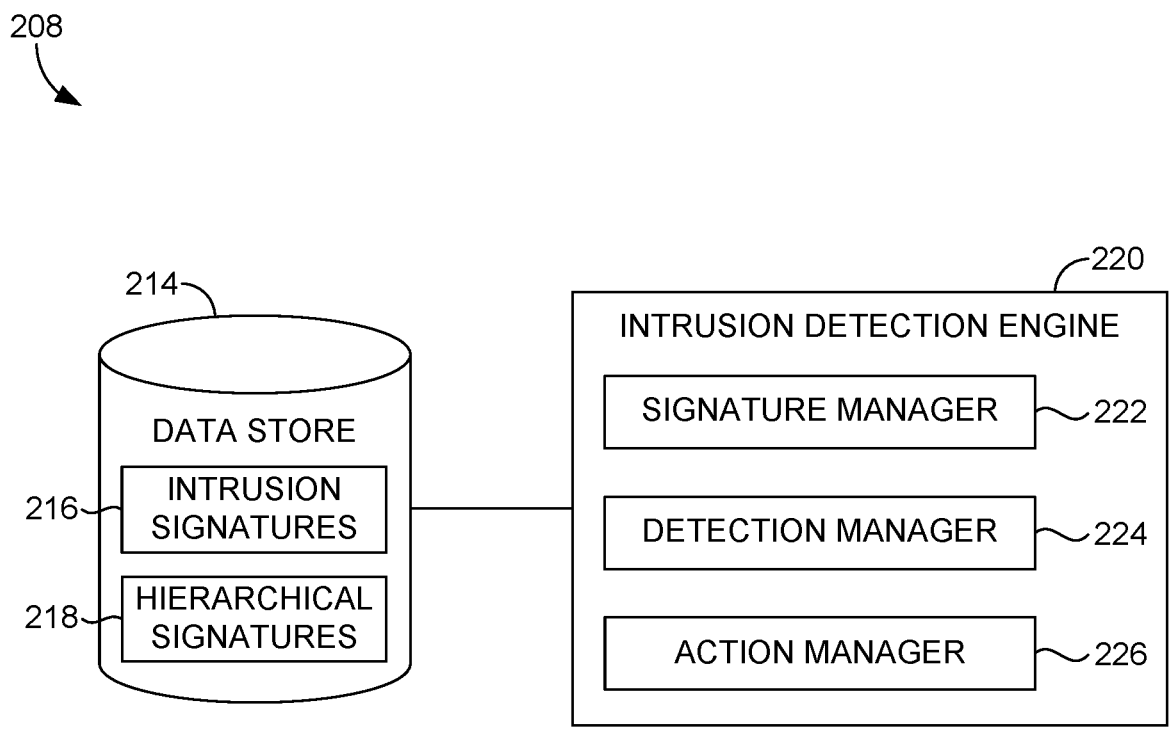
FIG. 2 depicts an example configuration of an operating environment in which some implementations of the present disclosure can be employed, in accordance with various embodiments of the present disclosure.

Referring to FIG. 2, aspects of an illustrative intrusion detection system 208 are shown, in accordance with various embodiments of the present disclosure. Generally, intrusion detection system 208 is configured to facilitate identifying or detecting intrusive or malicious communications, such as, network packets transmitted via a network. In embodiments, the intrusion detection system 208 includes an intrusion detection engine 220 having a signature manager 222, a detection manager 224, and an action manager 226. The foregoing components of intrusion detection engine 220 can be implemented, for example, in operating environment 100 of FIG. 1.

Data store 214 can store computer instructions (e.g., software program instructions, routines, or services), data, and/or algorithms used in embodiments described herein. In some implementations, data store 214 stores information or data received or generated via the various components of intrusion detection engine 220 and provides the various components with access to that information or data, as needed. Although depicted as a single component, data store 214 may be embodied as one or more data stores. Further, the information in data store 214 may be distributed in any suitable manner across one or more data stores for storage (which may be hosted externally).

In embodiments, data stored in data store 214 includes intrusion signatures 216 and hierarchical signatures 218. An intrusion signature generally refers to a set of intrusion attribute values combined together that reflect or represent an indication of intrusion. Accordingly, an intrusion signature may have a series or set of intrusion attribute values that, as a set, indicate an intrusive communication. Generally, intrusion signatures are designated as intrusive or malicious. A set of intrusion attribute values may be associated with any number of intrusion attributes or parameters that can indicate or be associated with intrusive communications. An intrusion attribute generally refers to a type of data that can be used to identify or indicate intrusive communications. By way of example, intrusion attributes may include a source IP address (SAI), a source port number (SP), a destination IP address (DIA), destination port number (DP), and/or a pattern (P) matching with payload of a packet. As such, intrusion attributes may be a type of data that can be identified via a communication, such as a network packet. In some cases, an intrusion signature may also include an action, or set of actions, to apply in the event a communication is identified as matching the signature. The particular intrusion attributes defined for intrusion signatures may vary for different signature-based intrusion systems.

Intrusion signatures can be user provided or generated automatically (e.g., in association with previous malicious communications). In some cases, data store 214 can obtain intrusion signatures 216 from devices or servers, such as user device 102 of FIG. 1, intrusion detection console 110 of FIG. 1, intrusion detection system 108 of FIG. 1, or the like. The data store 214 can provide, or otherwise enable access of, intrusion signatures to intrusion detection engine 220.

Hierarchical signatures generally refer to a set of intrusions attributes values arranged or distributed in a hierarchical manner. In this regard, a set of intrusion attributes values corresponding with an intrusion signature are tiered or arranged in a set of hierarchical data tables or array structures. Such a set of hierarchical data structures enables efficient detection of suspect communications, that is, communications inferred to be intrusive or malicious. Generally, as described herein, the intrusion detection engine 220 generates hierarchical signatures via intrusion signatures 216 and communicates the hierarchical signatures to the data store 214 for subsequent use in detecting intrusive communications.

Although illustrated as one data store with intrusion signatures and hierarchical signatures, as can be appreciated, the data may be stored in separate data stores. Further, the data store 214 may include any other type of data generated by or used by the intrusion detection engine 220.

The intrusion detection engine 220 is generally configured to facilitate identifying or detecting intrusive or malicious communications. For examples, as communication packets, or network packets, are transmitted to or from a device or system, an intrusion detection engine, or portion thereof, may monitor the communication packets to detect whether any of such communication packets are suspect of being intrusive or malicious communication packets. At a high level, and as described in more detail below, the intrusion detection engine 220 generally uses a hierarchical approach to identify suspect communications.

As shown, in embodiments, the intrusion detection engine 220 includes a signature manager 222, a detection manager 224, and an action manager 226. Any number or combination of components can be used to implement the various functionalities described herein.

The signature manager 204 is generally configured to manage signatures. As described, a signature generally refers to a pattern or known identity that can be used to match to a current communication to detect intrusion. In conventional implementations, signatures are typically in the form of a series or group of intrusion attribute values, generally referred to herein as intrusion signatures. Such intrusion signatures may be acquired (and stored in the data store) from users or automatically generated. Generally, such intrusion signatures are generated or user provided based on previous detected intrusions such that the same threat, if subsequently made, can be detected. One example intrusion signature is: "S1: BLOCK 172.30.136.81 23 172.30.137.21 3128 'JOE.'" Such a signature includes a value of "BLOCK" indicating an action, a value of "172.30.136.81" indicating a source IP address, a value of "23" indicating a source port, a value of "172.30.137.21" indicating a destination IP address, a value of "3128" indicating a destination port, and a value of "JOE" indicating a pattern.

At a high level, the signature manager 204 preprocesses intrusion signatures to generate a set of hierarchical signatures for use in detecting intrusions. In this regard, the signature manager 204 generates a hierarchal set of data structures containing various aspects of signatures. In particular, each level of the hierarchy can correspond with a particular attribute type. As described herein, the hierarchical signatures in the form of hierarchical data structures (e.g., arrays) enable efficient intrusion detection.

Initially, the signature manager 204 can access a set of intrusion signatures. As such, the signature manager 204 may access intrusion signatures 216 from the data store 214. The data store 214 may obtain intrusion signatures from any number of devices, such as user devices and/or intrusion detection consoles, at which a user provides intrusion signatures previously detected as malicious. Additionally or alternatively, such intrusion signatures may be automatically determined based on previous detection of malicious intent. In one embodiment, the signature manager 204 may access intrusion signatures to generate hierarchical signatures based on an input request (e.g., via an administrator operating an intrusive detection console). In another embodiment, the signature manager 204 may access intrusion signatures to generate hierarchical signatures in accordance with a set of intrusion signatures being obtained at the data store (e.g., a new or updated set of intrusion signatures).

The signature manager 204 may analyze each intrusion signature, and intrusion attribute values associated therewith, to generate a hierarchical set of data structures. To this end, the signature manager 204 generally uses intrusion attribute values of the intrusion signatures to generate a hierarchical set of data structures. Data structures may be in any number of forms, but are generally referred to herein in the form of arrays. An array generally refers to a collection of variables, elements, or attribute values of a same data type. In this regard, a set of attribute values in an array may correspond with a particular intrusion attribute. Each data structure, or array, can include a set of unique values for a particular intrusion attribute. As described more fully below, a unique value in a particular array can point to a subsequent data structure in a next level of the hierarchy.

In one implementation, each level of the hierarchical structure corresponds with a particular intrusion attribute. For example, a first or top level in a hierarchical structure may correspond with a first attribute, a second level below the first level in the hierarchical structure may correspond with a second attribute, and so forth. The order of the intrusion attributes arranged in the levels may be in any manner. In one embodiment, the order of the levels may correspond with a general order of intrusion attributes in intrusion signatures. For example, assume an intrusion signature is in the form of attribute 1; attribute 2; and attribute 3. In such a case, attribute 1 may be at the highest level of the hierarchical structure, followed by attribute 2 at the next subsequent level, and attribute 3 at the next subsequent level. In other cases, the order of the levels may be predetermined or designated, for example, by an administrator.

In analyzing an intrusion signature, the analysis of the attribute values within the intrusion signature may be performed or executed in a sequential manner that corresponds with the level sequence of the hierarchy. For example, assume a first level of the hierarchy corresponds with a first intrusion attribute and a second level corresponds with a second intrusion attribute. In such a case, the value associated with the first attribute in the intrusion signature may be analyzed followed by the value associated with the second attribute in the intrusion signature. When a value is identified as unique for a particular intrusion attribute sequence, the value is added to a data structure that corresponds with the preceding series of attributes. In this way, when a value is identified from a set of intrusion signatures for a first time for a particular preceding series of attribute values, the unique value is added to a corresponding data structure. In this way, each unique value in a particular data structure has a same previous sequence of attributes but different subsequent sequence of attributes. In cases in which a data structure does not yet exist, the detection manager 224 can generate the data structure.

Each data structure may include a set of unique values and corresponding pointers that point to a unique subsequent array for the particular unique value. Such unique values and corresponding pointers may be represented as hash objects or key-value pairs. In this way, each data structure or array may include a set of key-value pairs that indicate the intrusion attribute value of the current array and a pointer to a set of attribute values of the subsequent level associated with another intrusion attribute. A value in a key-value pair may represent a unique value for a particular intrusion attribute. A key in a key-value pair may include a pointer to a next data structure or node associated with the current value. In this regard, a particular intrusion attribute value in an array corresponds with a next array having a set of unique values for a subsequent intrusion attribute.

Figure 3:
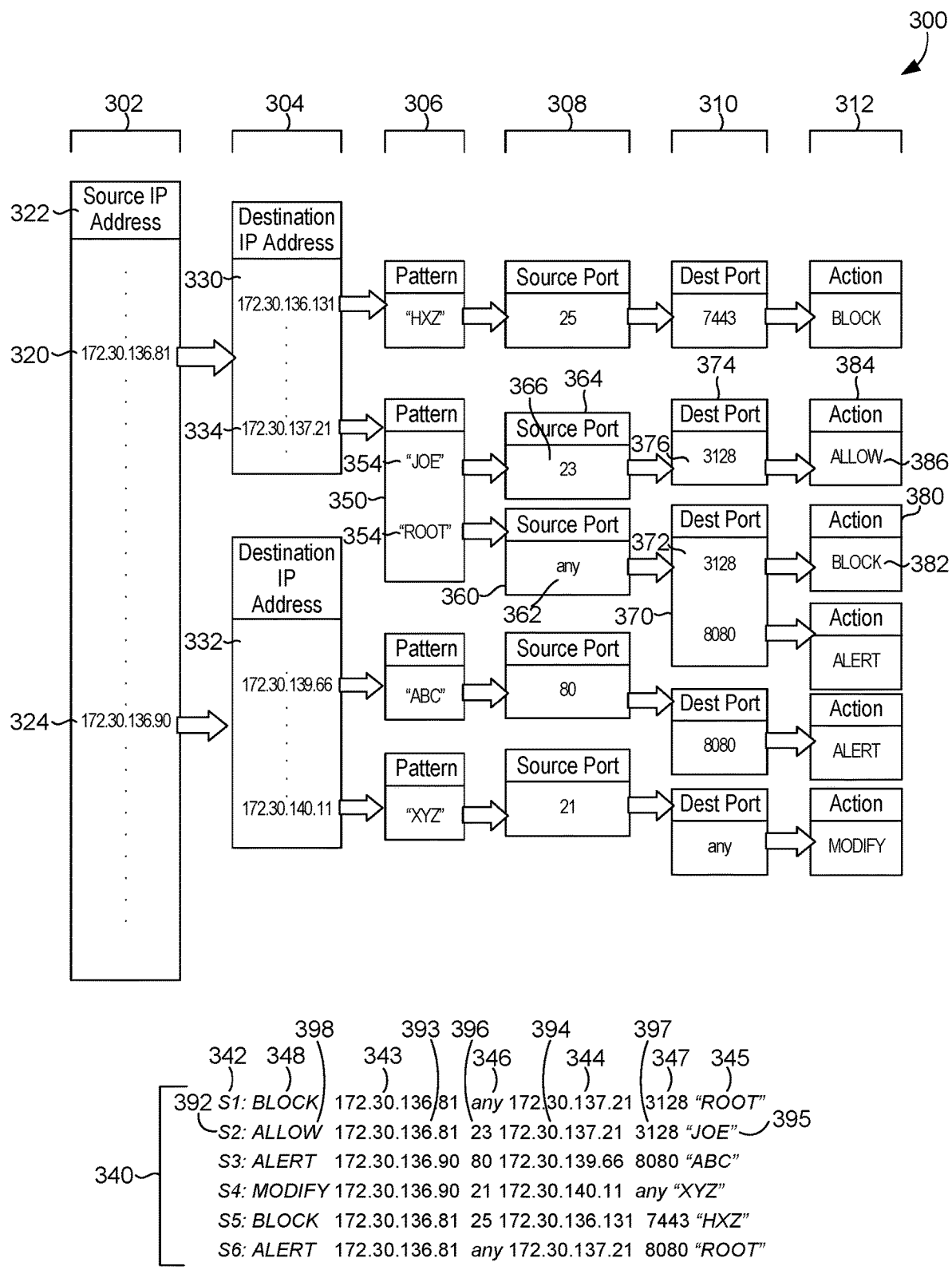
FIG. 3 illustrates one example illustrating a set of hierarchical data structures, in accordance with embodiments of the present disclosure.

One example of a hierarchical set of data structures, or arrays, is illustrated in FIG. 3. FIG. 3 illustrates a hierarchical structure of arrays 300. Each level of the hierarchy corresponds with a particular intrusion attribute. In this example, the first level 302 of the hierarchical structure corresponds with source IP addresses, the second level 304 corresponds with Destination IP addresses, the third level 306 corresponds with patterns, the fourth level 308 corresponds with source port, the fifth level 310 corresponds with destination port, and the sixth level 312 corresponds with action. As previously described, the order of the attributes distributed across hierarchical levels can be of any order. In some cases, the order may follow a sample or set of intrusion signatures. In other cases, the order may be specified or predefined, for example, by an administrator or a default order.

Each value in an array points to a next array that has a set of unique values associated with the value to which pointed to the next array. For example, the unique value 320 in the source IP address array 322 points to array 330 that includes a unique set of destination IP addresses that correspond with the unique value 320. Similarly, the unique value 324 in the source IP address array 322 points to array 332 that includes a unique set of destination IP addresses that correspond with the unique value 324.

Continuing with FIG. 3 to provide an illustrative example of generating hierarchical structure of arrays 300, assume a set of intrusion signatures 340 are used to generate the hierarchical structure of arrays 300. In such a case, each intrusion signature of the set of intrusion signatures 340 is analyzed in accordance with the levels of the hierarchical structure. Starting with the first signature S1 342, assume the source IP address 343, 172.30.136.81, is identified as a unique value, that is not already included in the array 322. In such a case, the unique source IP address value 320 is added to the source IP address array 322 of the first level 302 of the hierarchical structure. Although not illustrated, the source IP address 172.30.136.81 can be stored as a hash object or key-value pair such that the unique source IP address 320 corresponds with a pointer to destination IP address array 330. For example, the key-value pair may include the value 172.30.137.21 and a pointer to array 330 corresponding with the unique value 320.

Now assume the next subsequent attribute (in accordance with the hierarchy levels), the destination IP address 344, 172.30.137.21, is identified as a unique value that is not already included in array 330. In such a case, the unique destination IP address value 334 is added to the destination IP address array 330 of the second level 304 of the hierarchical structure. Continuing with the first signature, assume the next subsequent attribute to analyze is the pattern attribute 345, "ROOT," which is identified as a unique value that is not already included in pattern array 350. As shown, the pattern array 350 is an array generated specific for the previous destination IP address value 334. As such, each unique value in pattern array 350 corresponds with destination IP address value 334, which in turn corresponds with source IP address 320. As "ROOT" is a unique value not already included in the pattern array 350, the unique pattern 352 is added to the pattern array 350 of the third level 306 of the hierarchical structure. Further assume that the subsequent attribute source port 346 of "any" in the first signature 342 is identified as a unique value that is not already included in array 360. As such, the unique source port 362 is added to the source port array 360 of the fourth level 308 of the hierarchical structure. The next subsequent attribute destination port 347 of "3128" is identified as a unique value that is not already included in array 370. As such, the unique destination port 372 is added to the destination port array 370 of the fifth level 310 of the hierarchical structure. The next subsequent attribute action 348 of "BLOCK" is identified as a unique value that is not already included in array 380. As such, the unique action 382 is added to the action array 380 of the sixth level 312 of the hierarchical structure.

As can be appreciated, for a first signature analyzed, each attribute should be identified as unique and included in an array. In cases in which an array does not exist (e.g., subsequent to an identified unique value), a new array may be generated. Further, although each array illustrates unique values, each entry in an array may include a hash object or a key-value pair that includes the unique value and a pointer to the next subsequent array. In some cases, the action may be unique for each path such that only one action is included in the last array. In other cases, multiple actions may be applicable to a particular signature.

Continuing with this example, the second signature S2 390 is analyzed. In the second signature S2 392, assume the source IP address 393, 172.30.136.81, is identified as a duplicative value. In particular, the source IP address 393 is identified as a value that is already included in the array 322. In such a case, another entry of the value is not added to the source IP address array 322 of the first level 302 of the hierarchical structure. Now assume the next subsequent attribute (in accordance with the hierarchy) of the destination IP address 394, 172.30.137.21, is also identified as a duplicative value that is already included in array 330. In such a case, another duplicative entry is not added to the destination IP address array 330 of the second level 304 of the hierarchical structure. Continuing with the second signature 392, assume the next subsequent attribute of the pattern 395 is "JOE," which is identified as a unique value that is not already included in array 350. In such a case, the unique pattern 354 is added to the pattern array 350 of the third level 306 of the hierarchical structure. Further assume that the next subsequent attribute source port 396 of "23" is identified as a unique value that is not already included in array 364. As such, the unique source port 366 is added to the source port array 364 of the fourth level 308 of the hierarchical structure. The next subsequent attribute destination port 397 of "3128" is identified as a unique value that is not already included in array 374. As such, the unique destination port 376 is added to the destination port array 374 of the fifth level 310 of the hierarchical structure. Finally, assume the next subsequent attribute action 398 of "ALLOW" is identified as a unique value that is not already included in array 384. As such, the unique action 386 is added to the action array 384 of the sixth level 312 of the hierarchical structure.

Such a process can iteratively continue to analyze each signature of the set of signatures 340 to generate the set of hierarchical data structures 300. In some cases, in accordance with identifying a unique value for a particular array, the subsequent array may be generated in addition to the pointer to the array. For example, when the new unique action 398 of "ALLOW" is identified within the second signature 392, the corresponding array 384 may be generated and "allow" 386 included therein. Further, as described herein, in some implementations, unique values may be added to an array in sorted order. Such a sorted order may be a numerical order or an alphabetical order. Utilizing a sorted order can facilitate a more efficient binary search for matching attributes.

Below provides one example algorithm for generating a hierarchical data structure.

| Step 1: | For i = 1 to i = m repeat Step 2 to Step 13 |
|---|---|
| Step 2: | Fetch Source IP address $SIP_i$ |
| Step 3: | If IP address $SIP_i$ spotted first time, add the IP address in an array in sorted order. |
| Step 4: | Fetch Destination IP address $DIP_i$ |
| Step 5: | If IP address $DIP_i$ spotted first time for $SIP_i$, add the IP address $DIP_i$ in an array in sorted order corresponding to its Source IP address $SIP_i$. |
| Step 6: | Fetch Pattern $P_i$ |
| Step 7: | If pattern $P_i$ spotted first time, for $SIP_i$ and $DIP_i$ add the pattern in array in sorted order. |
| Step 8: | Fetch Source port number $SP_i$ of signature $S_i$ Where $0 \leq SP_i \leq 65535$ |
| Step 9: | If port number $SP_i$ spotted first time, for $SIP_i$, $DIP_i$ and $P_i$, add $SP_i$ in an array in sorted order. |
| Step 10: | Fetch Destination port number $DP_i$ of signature $S_i$ Where $0 \leq DP_i \leq 65535$ |
| Step 11: | If port number $DP_i$ spotted first time, for $SIP_i$, $DIP_i$, $P_i$ and $SP_i$, add $DP_i$ in an array in sorted order. |
| Step 12: | Fetch action $A_i$ of signature $S_i$. |
| Step 13: | If action $A_i$ spotted once for $SIP_i$, $DIP_i$, $P_i$, $SP_i$, and $DP_i$, add $A_i$, in an array in sorted order. |
| Step 14: | End. |

Such an algorithm is only one example and may be implemented in various ways. For example, utilizing different intrusion attributes or arranging intrusion attributes in a different order in the hierarchy can result in modifications to this example algorithm.

The detection manager 224 is generally configured to detect suspect communications. Suspect communications generally refer to communications identified as potentially being malicious or intrusive. At a high level, to detect suspect communications, the detection manager 224 uses the hierarchical signatures, or the set of hierarchical data structures that hierarchically represent the intrusion signatures. In particular, a communication being monitored can be analyzed to identify whether the communication matches an intrusion signature via the set of hierarchical data structures.

To do so, the detection manager 224 can collect, obtain, receive, retrieve, or otherwise access communication data, such as network packet data being communicated over a network. In this regard, communication data can be extracted or obtained from a network packet being monitored. Communication data generally refers to any information or data associated with the communication (e.g., network packet). In embodiments, communication data includes data attribute values that correspond with the different types of attributes represented in signatures. For example, assume a set of signatures include values associated with attribute A, attribute B, and attribute C. In such a case, the detection manager 224 can obtain or extract values associated with attribute A, attribute B, and attribute C. As previously described, the communication can be obtained at any point or component on a network, such as, for example, a switch. A communication may be incoming or outgoing to a particular device (e.g., switch, user device, etc.).

In some cases, communication data may be obtained from data store 214 as the communication data may already be extracted from communications and stored as communication data. In other cases, the detection manager 224 may obtain communications (e.g., in real time over the network) and, thereafter, extract or otherwise obtain communication data, such as data attribute values within the communication. Such data attribute values may be any value associated with a data attribute, such as a source IP address, a destination IP address, a pattern, a source port, a destination port, and/or the like.

In some cases, communication data is obtained on a periodic basis. In this regard, the detection manager 224 may operate to obtain communication data after a lapse of a time duration, such as, for instance, two minutes. In other cases, communication data may be obtained in a continuous manner or based on occurrence of an event or reception of an instruction. As can be appreciated, the detection manager 224 generally obtains communication data associated with communications during a time period, irrespective of whether such communications are malicious.

In accordance with obtaining communication data, such as data attribute values associated with a communication, the detection manager 224 is generally configured to facilitate detection of suspect communications. In particular, the detection manager 224 utilizes a hierarchical approach to detect suspect communications. Advantageously, as described, using a hierarchical approach to detect suspect communication results in a more efficient packet scanning procedure and detection of suspect communication.

In operation, the detection manager 224 can analyze data attribute values associated with a communication in a manner that corresponds with an order of intrusion attributes within a set of hierarchical data structures. For example, assume a set of hierarchical data structures or arrays includes a source IP address attribute at a first level of the hierarchy and a destination IP address attribute at a second, subsequent level of the hierarchy. In such a case, the detection manager 224 may analyze a source IP address associated with the communication followed by analysis of a destination IP address associated with the communication.

Generally, the detection manager 224 analyzes the data attribute values of a communication to identify whether such values associated with a communication can be mapped to intrusion attribute values of a signature. To map the data attribute values to the intrusion attribute values of a signature, the set of hierarchical signatures, including the intrusion signatures represented in a hierarchical form of data structures (e.g., hierarchical data structures generated via the signature manager 222), can be accessed and used. In some cases, the hierarchical signatures 218 may be accessed from the data store 214 for use in determining whether a communication is suspect.

Attribute mapping generally maps or associates data attribute values of a communication (e.g., a particular extracted set of values) to a set of corresponding intrusion attribute values included in the hierarchical signatures. For example, an attribute mapping may include a source IP address of a network packet mapped to a first source IP address value in a first array, and a destination IP address of the network packet mapped to a first destination IP address value in a second array that corresponds with the first array. In cases that data attribute values map to, or match with, a sequence of intrusion attribute values, the detection manager 224 can identify the communication as suspect.

As described, to identify whether a set of data attribute values of a communication match, or map to, a sequence of intrusion attributes associated with a signature, the detection manager 224 can utilize the hierarchical signatures generated via signature manager 222. In this regard, the detection manager 224 can use a set of hierarchical data structures, with each data structure including various key-value pairs associated with a particular attribute. For instance, a data structure associated with source IP addresses includes a set of key-value pairs that include unique source IP address values and corresponding pointers to subsequent data structures. Each source IP address value points to a different subsequent data structure at a same level of the hierarchy.

Generally, for each data attribute value analyzed, an automated or programmatic determination can be made as to whether the data attribute value matches a corresponding intrusion attribute value in a data structure. In this regard, it is determined whether the data attribute value programmatically (automatically performed via a computer program) matches a corresponding intrusion attribute value in a data structure. If so, a subsequent attribute matching determination can be made. If not, the detection manager 224 can determine that the communication is not suspect. This matching process can be followed through each level of the hierarchical structure such that each type of attribute in the hierarchical structure is analyzed, or until a match is not made at a particular level of the hierarchy in which case the analysis is completed.

As one example, assume a network communication is obtained including a set of data attribute values. Further assume a set of hierarchical data structures are arranged in a sequential order of attributes as follows: source IP address→destination IP address→pattern→source port→destination port→action. In such a case, upon obtaining the network communication via a network, a source IP address SIP1 is obtained (e.g., extracted). A determination can be made as to whether the source IP address SIP1 matches any intrusion attribute values in a first array corresponding with source IP addresses. In cases in which the source IP addresses are arranged in a sorted order in the array, the time complexity for performing the search can be reduced to O (log m). Based on identifying a matching IP address value in the first array, the next level in the set of hierarchical data structures is analyzed, which in this case is destination IP addresses. As described herein, in some embodiments, a particular value in one hierarchical data structure may include a key that indicates a subsequent hierarchical data structure that corresponds with the particular value. As such, when a match is identified at the source IP address hierarchical level, a corresponding pointer to a next data structure can be used for the subsequent attribute analysis. Accordingly, a determination can be made as to whether the destination address DIP1 of the communication matches with a destination IP address value in a second array corresponding with destination IP addresses. As described, such a matching process may be performed with O (log m) complexity in cases that the destination IP addresses are arranged in sorted order in the second array. Based on detecting a match, the corresponding pointer can indicate a next pattern data structure to analyze for a match with the pattern value in the communication. Each level of the hierarchical structure may be traversed in sequence to analyze matching attributes. When a match is detected, the subsequent hierarchy level is analyzed until the last level of the hierarchy is reached, or until no match is found at a particular hierarchy level.

One example algorithm that may be used to perform the mapping, or matching, is provided herein:

| | |
|---|---|
| Step 1: | For i = 1 to n step 2 to step 18 |
| Step 2: | Fetch Packet $P_i$ from network. |
| Step 3: | Fetch Source IP address $SIP_i$ of packet $P_i$. |
| Step 4: | Match with IP address $SIP_j$ with O (log m) complexity, since IP address arranged in sorted order. $1 \leq j \leq m$, where m is number of rules. |
| Step 5: | If found, go to step 6 else pass the packet and go to step 2. |
| Step 6: | Fetch Destination IP address $DIP_i$ of Packet $P_i$ |
| Step 7: | Match with IP address $DIP_i$ corresponding to $SIP_j$ with O (log m) complexity, since IP address arranged in sorted order. |
| Step 8: | If found, go to step 9 else pass the packet and go to step 2. |
| Step 9: | Fetch Pattern $P_i$ of packet $P_i$. |
| Step 10: | Match with Pattern $P_j$ corresponding to $SIP_j$ and $DIP_i$ with O (log m)complexity, since Pattern arranged in sorted order. |
| Step 11: | If found, go to step 12 else pass the packet and go to step 2. |
| Step 12: | Fetch Source port number $SP_i$ of signature $S_i$ where $0 \leq SP_j \leq 65535$ |
| Step 13: | Match with $SP_j$ corresponding to $SIP_j$, $DIP_i$ and $P_j$ with O (log m)complexity, since source port arranged in sorted order. |
| Step 14: | If found, go to step 14 else pass the packet and go to step 2. |
| Step 15: | Fetch Destination port number $DP_i$ of signature $S_i$ Where $0 \leq DP_i \leq 65535$ |
| Step 16: | Match with $DP_j$ corresponding to $SIP_i$, $DIP_j$, $P_i$ and $SP_j$ with O (log m)complexity, since destination port arranged in sorted order. |
| Step 17: | If found, go to step 18 else pass the packet and go to step 2. |
| Step 18: | Check action $A_j$ corresponding to $SIP_i$, $DIP_i$, $P_i$, $SP_j$ and $DP_i$, if the action is BLOCK discard else take appropriate action as per defined and go to step 2. |
| Step 19: | End |

In one implementation, a binary approach is used to perform attribute matching. In operation, a binary approach can be efficiently performed when the data structure includes a sorted order of unique values. As described, a sorted order may include an alphabetical order, a numerical order, or any other discernable order. Utilizing a binary approach to search for attribute matches within a data structure enables a more efficient search. In particular, using a binary search approach enables a logarithmic time execution. In this way, for a particular array, a matching value should be identified in log m time (each array has a maximum of m values, where m represents a number of signatures).

As one example of a binary approach, assume an array has a set of unique values arranged in a sorted order (e.g., numerically). Using a binary approach, a median value in the set of unique values can be first assessed to determine whether that value matches a communication value. If no match, and the communication value is lower than the median value, a middle value of the first half of values can be assessed for a match. If no match, and the communication value is higher than the median value, a middle value of the second half of values can be assessed for a match. As such, the set of values in the array on which to perform matching is quickly reduced in half. When a match is identified, the search process is discontinued for that array and a subsequent array, if any, is analyzed in a similar binary manner.

The action manager 226 is generally configured to manage actions identified via the detection manager 224. In this regard, in cases that a communication is determined to be a suspect communication, the action manager 226 may initiate or trigger a corresponding action. In some cases, the signature indicates an action to apply. For example, and as illustrated in FIG. 3, an action to take for various signatures may be block, allow, alert, and modify. A block action generally refers to blocking the communication from being routed to its targeted destination, or any further within the network. In such a case, the action manager 226 may initiate blocking the communication from proceeding through the network. An allow action generally refers to allowing the communication to continue to its targeted destination. In such a case, the action manager 226 may initiate continued delivery of the communication. An alert action generally refers to providing an indication or notification of the suspect communication. In such a case, the action manager 226 may initiate or send a communication to an intrusion detection console including a notification of the suspect communication, or data associated therewith (e.g., the communication itself or data contained therein). The intrusion detection console may further analyze the communication, store the intrusion data, and/or provide the suspect communication (or data associated therewith) for display, for example, as an alert. A modify action generally refers to performing a modification to the communication. In such a case, the action manager 226 may initiate, request, and/or perform a modification to the communication (e.g., remove payload data). As one example, assume a packet is identified as corresponding with a modify action. In such a case, a notification may be provided to a network administrator to request or require modifications to the packet and, thereafter, the packet can be allowed.

As can be appreciated, multiple actions may be initiated and/or performed. For instance, a packet identified as suspect may be blocked and an alert provided to an intrusion detection console, or may be allowed and an alert provided to an intrusion detection console. In some cases, an action to take may not be intrusion-signature specific. For example, a default action may exist such that when any communication is identified as suspect, a particular action (e.g., alert action) is performed. As shown, the action manager 226 may perform such actions or initiate such actions to be performed via another component.

As described herein, various aspects may operate in parallel to further increase efficiency of communication monitoring, or suspect communication detection. In this regard, multiple intrusion detection engines, or portions thereof, may operate in parallel within a network system. For example, multiple detection managers and/or action managers may operate to manage analysis of different packets transmitted via a network.

Figure 4:
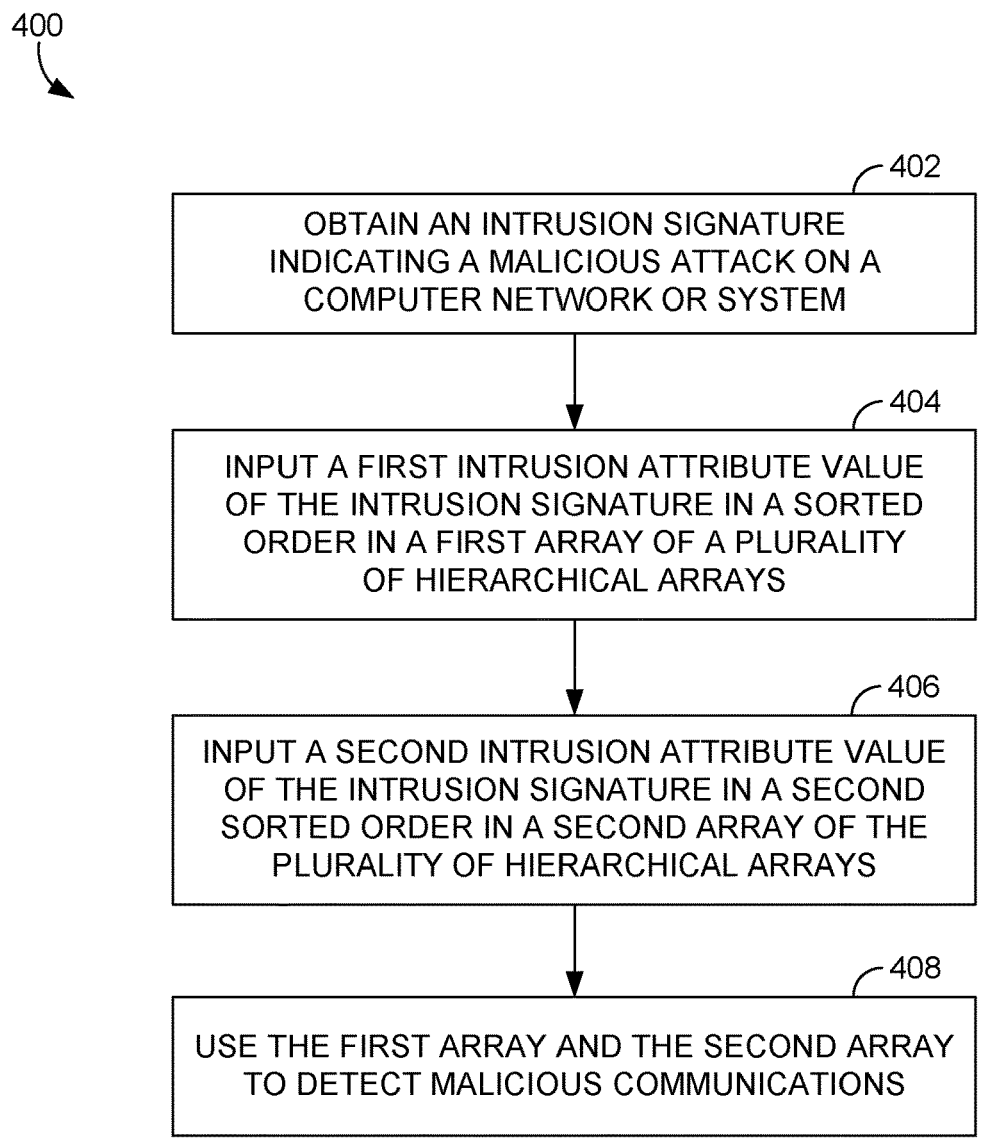
FIG. 4 is a process flow of an example for generating hierarchical signatures, in accordance with embodiments of the present disclosure.

Turning now to FIGS. 4-8, FIGS. 4-8 represent various method flows for implementing various aspects of the present technology. With reference to FIG. 4, a process flow is provided showing method 400 as one example for generating hierarchical signatures, or a set of hierarchical data structures representing intrusion signatures. Such a process flow may be executed via a signature manager 222 of FIG. 2. Initially, as indicated at block 402, an intrusion signature indicating a malicious attack on a computer network or system is obtained. The intrusion signature includes a first intrusion attribute value of a first attribute type and a second intrusion attribute value of a second type. The intrusion signature may be a user-provided signature or an automatically generated signature based on a previous malicious communication. At block 404, a first intrusion attribute value of the intrusion signature is input in a first sorted order in a first array of a plurality of hierarchical arrays. In embodiments, the first array is associated with a first attribute type. The first intrusion attribute value may be input in the first array based on a determination that the first intrusion attribute value does not already exist in the first array. For instance, the first array may be analyzed to determine that the first intrusion attribute value is not already included in the first array. At block 406, a second intrusion attribute value of the intrusion signature is input in a second sorted order in a second array of the plurality of hierarchical arrays. In embodiments, the second array is associated with the second attribute type and corresponds with the first intrusion attribute value in the first array. The second intrusion attribute value may be input in the second array based on a determination that the second intrusion attribute value does not already exist in the second array. At block 408, the first array and the second array are used to detect malicious communications provided over a network. In some cases, upon obtaining a communication, such as a network packet, traversing via the network, the communication may be analyzed to identify whether data attributes contained therein match intrusion attribute values within the first array and the second array.

Figure 5:
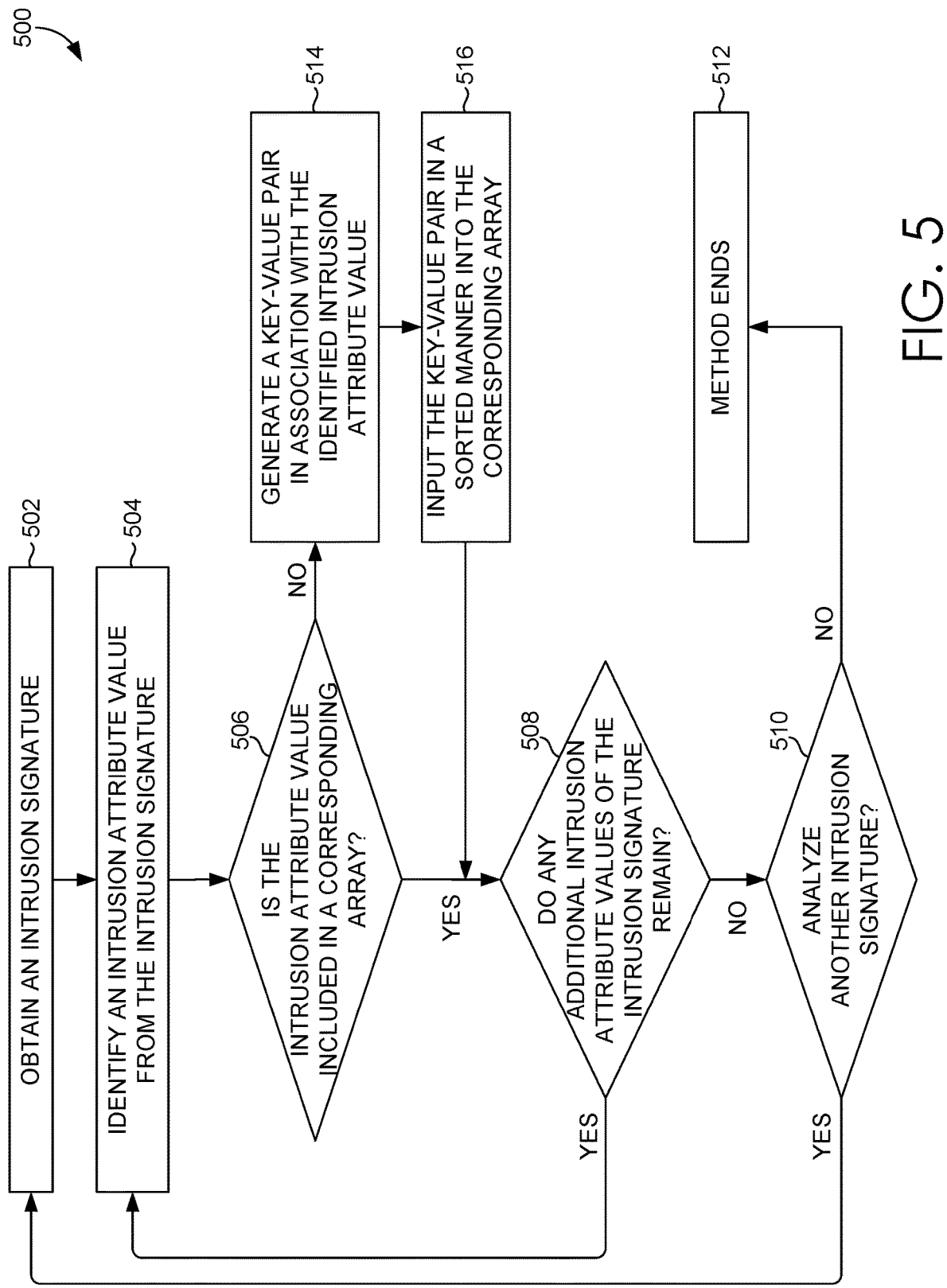
FIG. 5 is a process flow of another example for generating hierarchical signatures, in accordance with embodiments of the present disclosure.

FIG. 5 provides another example method 500 for generating hierarchical signatures, or a set of hierarchical data structures representing intrusion signatures, in accordance with embodiments described herein. Initially, at block 502, an intrusion signature is obtained. For example, a set of intrusion signatures stored in a data store may be referenced for preprocessing the signatures to generate hierarhical signatures. At block 504, an intrusion attribute value is identified from the intrusion signature. An intrusion attribute value may be any value corresponding with an intrusion attribute, such as a source IP address, a destination IP address, a pattern, a source port, a destination port, and/or the like. At block 506, a determination is made as to whether the identified intrusion attribute value is included in a corresponding array. If so, at block 508, a determination is made as to whether any additional intrusion attribute values of the intrusion signature remain. If so, the process returns to block 504. If not, the process flows to block 510, at which a determination is made as to whether another intrusion signature is to be analyzed. If so, the process returns to block 502. If not, the process ends at block 512.

Returning to block 506, if a determination is made that the identified intrusion attribute value is not included in a corresponding array, at block 514, a key-value pair is generated in association with the identified intrusion attribute value. In embodiments, the key-value pair includes the identified intrusion attribute value and a pointer to a subsequent array. At block 516, the key-value pair is input in a sorted manner into the corresponding array. In this regard, the key-value pair can be sorted using the value in accordance with a numerical order or an alphabetical order. Thereafter, the method proceeds to block 508 at which a determination is made as to whether any additional intrusion attribute values of the intrusion signature remain. If so, the process returns to block 504. If not, the process flows to block 510, at which a determination is made as to whether another intrusion signature is to be analyzed. If so, the process returns to block 502. If not, the process ends at block 512. In this way, an iterative approach is performed to analyze a set of signatures and input unique intrusion attribute values of the intrusion signatures into appropriate arrays in a hierarchical manner.

Figure 6:
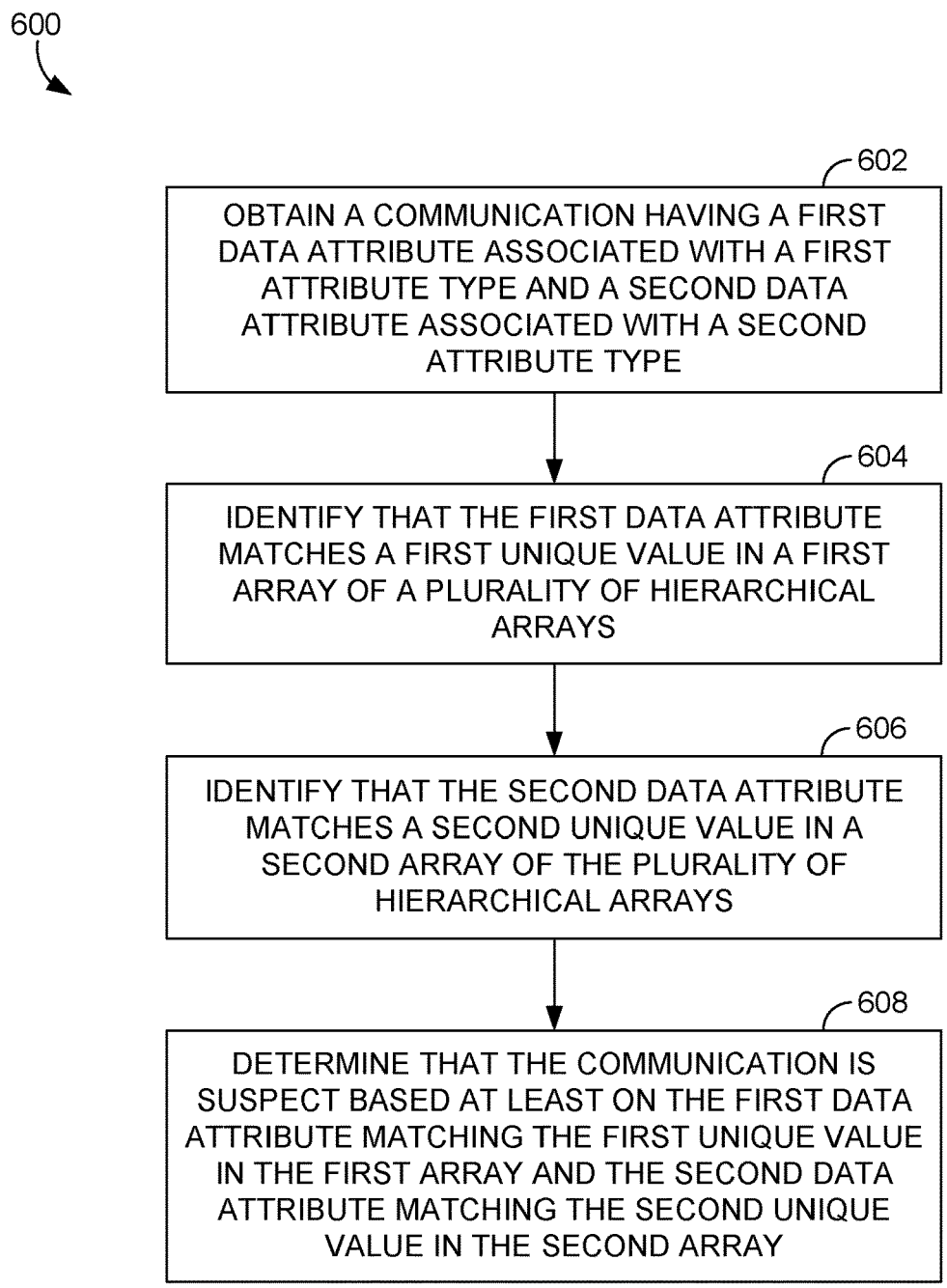
FIG. 6 is a process flow of one example for detecting suspect communications, in accordance with embodiments of the present disclosure.

Turning now to FIG. 6, a process flow is provided showing method 600 for detecting suspect communications, in accordance with embodiments described herein. Such a process flow may be executed via detection manager 224 of FIG. 2. At block 602, a communication having a first data attribute associated with a first attribute type and a second data attribute associated with a second attribute type is obtained. The communication may be obtained via a network component through which the communication traverses. At block 604, it is identified that the first data attribute matches a first unique value in a first array of a plurality of hierarchical arrays. The first array can be associated with a first attribute type. At block 606, it is identified that the second data attribute matches a second unique value in a second array of the plurality of hierarchical arrays. The second array can be associated with the second attribute type, and the second array can correspond with the first unique value in the first array. Based at least on the first data attribute matching the first unique value and the second data attribute matching the second unique value, it is determined, at block 608, that the communication is suspect of being malicious.

Figure 7:
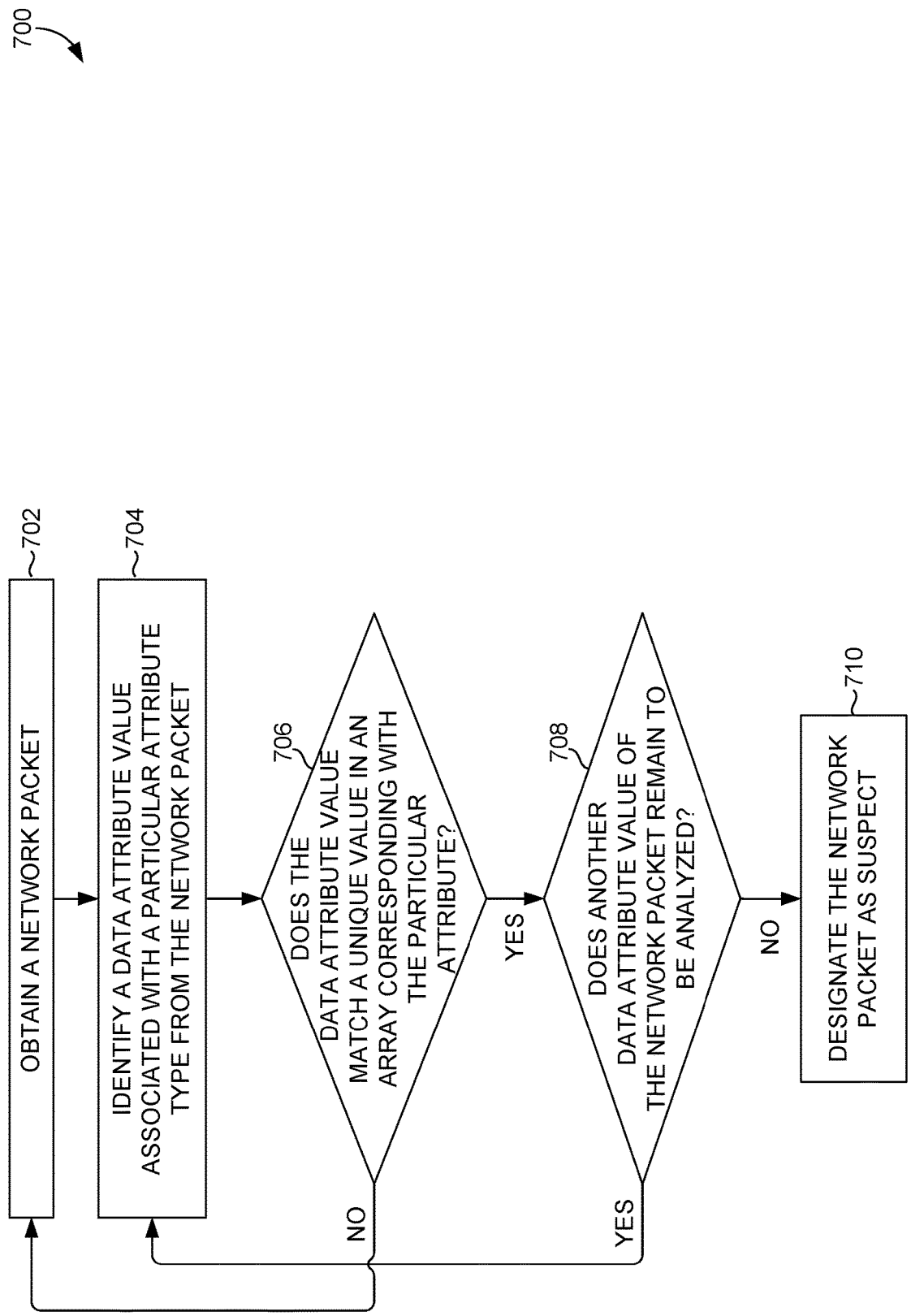
FIG. 7 is a process flow of another example for detecting suspect communications, in accordance with embodiments of the present disclosure.

FIG. 7 provides another example method 700 for detecting suspect communications, in accordance with embodiments described herein. Initially, at block 702, a network packet is obtained. Such a network packet may be obtained as the network packet is traversing a network. At block 704, a data attribute value associated with a particular attribute type is identified from the network packet. For example, a data attribute value associated with a first attribute type of a first level of a hierarchy may be extracted from the network packet. At block 706, a determination is made as to whether the data attribute value matches a unique value in an array corresponding with the particular attribute. For example, a binary search algorithm may be applied in an effort to identify a match to a value in an array of sorted unique values. If no match is identified, the method returns to block 702 at which a new network packet is obtained and analyzed.

Returning to block 706, if it is determined that the data attribute value of the network packet matches a unique value in an array corresponding with the particular attribute, the method proceeds to block 708 at which a determination is made as to whether another data attribute value of the network packet remains to be analyzed. For example, a data attribute value associated with a second attribute type of a second level of the hierarchy may be extracted from the network packet. Such a determination may be based on a sequential order of attribute types within the hierarchy (e.g., upon analyzing a last or final level of the hierarchy, no further analysis remains). If no additional attribute values remain to be analyzed, at block 710, the network packet is designated as suspect as it matches an intrusion signature as represented via a set of hierarchical structures. On the other hand, if a determination is made, at block 708, that another data attribute value of the network packet remains to be analyzed, the process returns to block 704 at which a data attribute value (e.g., a subsequent data attribute value) is identified from the network packet. In this way, an iterative approach is performed to efficiently analyze network packets using signatures represented in a hierarchical manner.

Figure 8:
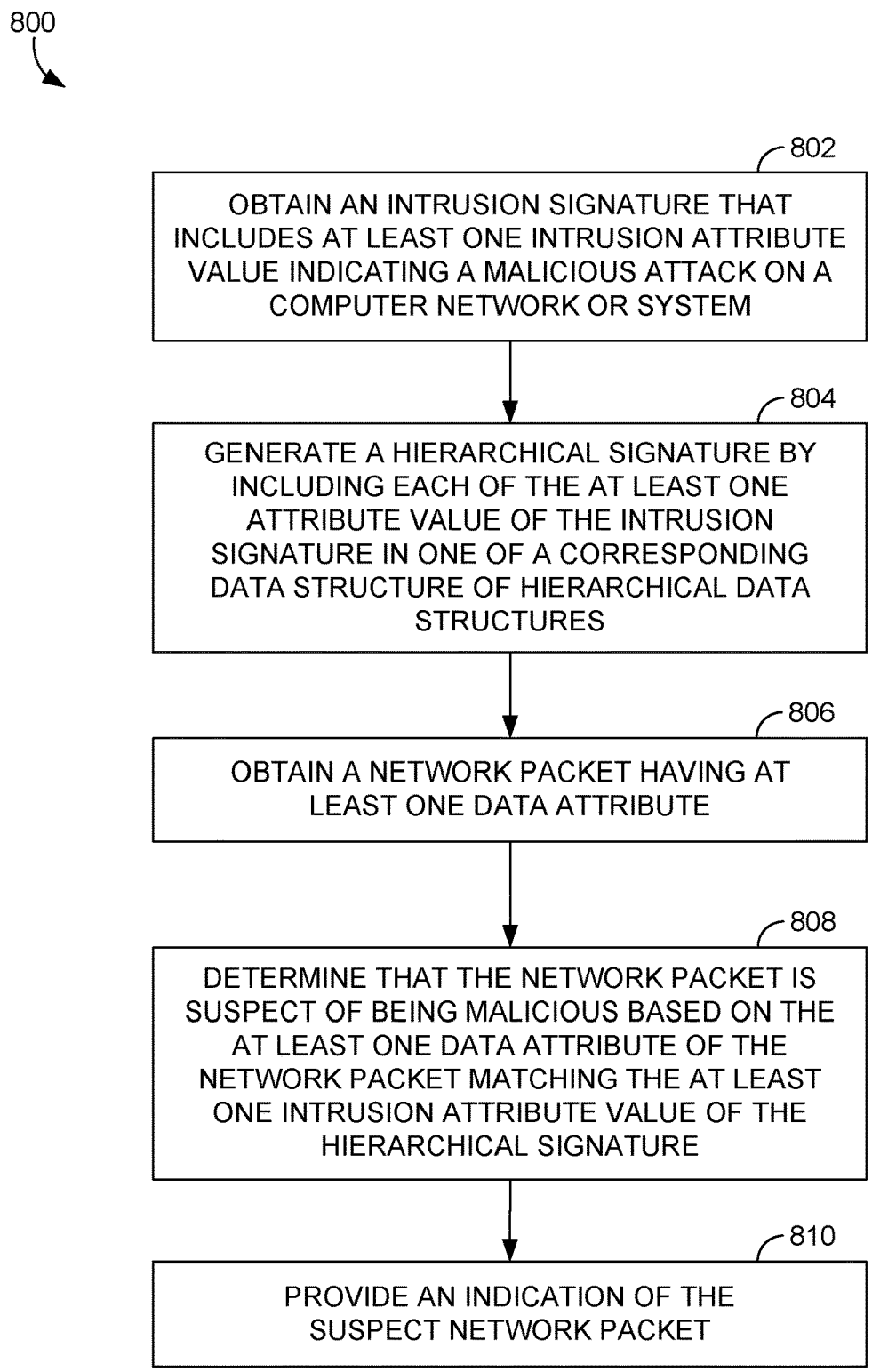
FIG. 8 is a process flow of another example for detecting suspect communications, in accordance with embodiments of the present disclosure.

With reference now to FIG. 8, a process flow is provided showing method 800 for detecting suspect communications, in accordance with embodiments described herein. Such a process may be executed in accordance with the intrusion detection engine 220 of FIG. 2, for example. Initially, at block 802, an intrusion signature that includes at least one intrusion attribute value indicating a malicious attack on a computer network or system is obtained. The intrusion signature may be user provided or automatically generated based on a previously malicious communication. Based on the intrusion signature, at block 804, a hierarchical signature is generated by including each of the at least one intrusion attribute value of the intrusion signature in one of a corresponding data structure of hierarchical data structures. To this end, each intrusion attribute value in the hierarchical signature can be analyzed in a predetermined sequence to add unique intrusion attribute values in a corresponding data structure. At block 806, a network packet, having at least one data attribute, communicated via a network is obtained. The network packet may be obtained as the network packet is traversing through a network. Thereafter, at block 808, a determination is made that the network packet is suspect of being malicious based on the at least one data attribute of the network packet programmatically matching the at least one intrusion attribute value of the hierarchical signature. As such, when attributes of the network packet match attributes of a signature, the network packet is identified as suspect. In accordance with embodiments described herein, a hierarchical structure is used to match the various attributes in a sequential order. At block 810, an indication of the suspect network packet is provided, for example, to an intrusion detection console.

As described herein, various embodiments may be employed to enhance suspect communication detection. In some embodiments, a computer-implemented method for identifying suspect communications is provided. The method can include obtaining an intrusion signature that includes at least one intrusion attribute value indicating a malicious attack on a computer network or system. The method can also include, based on the intrusion signature, generating a hierarchical signature by including each of the at least one intrusion attribute value of the intrusion signature in one of a corresponding data structure of hierarchical data structures. The method can further include obtaining a network packet, having at least one data attribute, communicated via a network. The method can further include determining that the network packet is suspect of being malicious based on the at least one data attribute of the network packet programmatically matching the at least one intrusion attribute value of the hierarchical signature. The method can further include providing an indication of the suspect network packet. In this way, embodiments of the disclosure enable a resource efficient implementation for scanning packets for intrusion detection and thereby decreasing network bandwidth.

In any combination of the above embodiments, the intrusion signature is user provided based on a previously detected malicious attack.

In any combination of the above embodiments, at least a portion of data structures of the hierarchical data structures include a plurality of unique values and corresponding pointers to subsequent data structures within the hierarchical data structures.

In any combination of the above embodiments, the plurality of unique values are arranged in a sorted order.

In any combination of the above embodiments, a first intrusion attribute value associated with a first type of intrusion attribute is included in a first corresponding data structure associated with the first type of intrusion attribute.

In any combination of the above embodiments, the hierarchical data structures are organized in a plurality of levels that correspond with different types of intrusion attributes.

In any combination of the above embodiments, the method can further comprise performing an action in association with the suspect network packet, wherein the action comprises an alert action, a modify action, a block action, and/or an allow action.

In any combination of the above embodiments, the method can further comprise programmatically determining, using a binary search algorithm, that the at least one data attribute of the network packet programmatically matches the at least one intrusion attribute value of the hierarchical signature.

In some embodiments, one or more computer-readable media having a plurality of executable instructions embodied thereon, which, when executed by one or more processors, cause the one or more processors to perform a method for identifying suspect communications are provided. The method can include obtaining an intrusion signature indicating a malicious attack on a computer network or system, the intrusion signature includes a first intrusion attribute value of a first attribute type and a second intrusion attribute value of a second type. The method can also include inputting the first intrusion attribute value in a first sorted order in a first array of a plurality of hierarchical arrays, the first array being associated with the first attribute type. The method can further include inputting the second intrusion attribute value in a second sorted order in a second array of the plurality of hierarchical arrays, the second array being associated with the second attribute type and corresponding with the first intrusion attribute value in the first array. The method can further include using the first array and the second array to detect malicious communications via a network. In this way, embodiments of the disclosure enable a resource efficient implementation for scanning packets for intrusion detection and thereby decreasing network bandwidth.

In any combination of the above embodiments, the first intrusion attribute value is input in the sorted order in the first array based on a determination that the first intrusion attribute value is a unique value for the first array.

In any combination of the above embodiments, the first sorted order comprises a numerical order or an alphabetical order.

In any combination of the above embodiments, the second attribute type comprises one of a source internet protocol address, a destination internet protocol address, a pattern, a source port, a destination port, or an action.

In any combination of the above embodiments, the method can further comprise generating the second array corresponding with the first intrusion attribute in the first array.

In any combination of the above embodiments, the first array includes a plurality of intrusion attribute values associated with the first attribute type and corresponding pointers to different arrays associated with the second attribute type.

In some embodiments, a computing system comprising one or more processors; and one or more non-transitory computer-readable storage media, coupled with the one or more processors, having instructions stored thereon, which, when executed by the one or more processors, is provided. The computing system can be caused to obtain a communication having a first data attribute associated with a first attribute type and a second data attribute associated with a second attribute type, the communication being communicated via a network. The computing system can be also caused to identify that the first data attribute matches a first unique value in a first array of a plurality of hierarchical arrays, the first array being associated with the first attribute type. The computing system can also be caused to identify that the second data attribute matches a second unique value in a second array of the plurality of hierarchical arrays, the second array being associated with the second attribute type, wherein the second array corresponds with the first unique value in the first array. The computing system can also be caused to based at least on the first data attribute matching the first unique value and the second data attribute matching the second unique value, determine that the communication is suspect of being malicious. In this way, embodiments of the disclosure enable a resource efficient implementation for scanning packets for intrusion detection and thereby decreasing network bandwidth.

In any combination of the above embodiments, the second array is indicated as corresponding with the first unique value in the first array by including a pointer, in association with the first unique value in the first array, to the second array.

In any combination of the above embodiments, the communication is obtained as the communication is traversing through the network.

In any combination of the above embodiments, the first array includes a plurality of unique values associated with the first attribute type and corresponding pointers to different arrays, including the second array, associated with the second attribute type.

In any combination of the above embodiments, the first data attribute is identified as matching the first unique value in the first array based on utilization of a binary search applied in association with the first array.

In any combination of the above embodiments, the computing system can be further caused to perform an action in relation to the communication, wherein the action comprises a block action, an allow action, an alert action, and/or a modify action.

Figure 9:
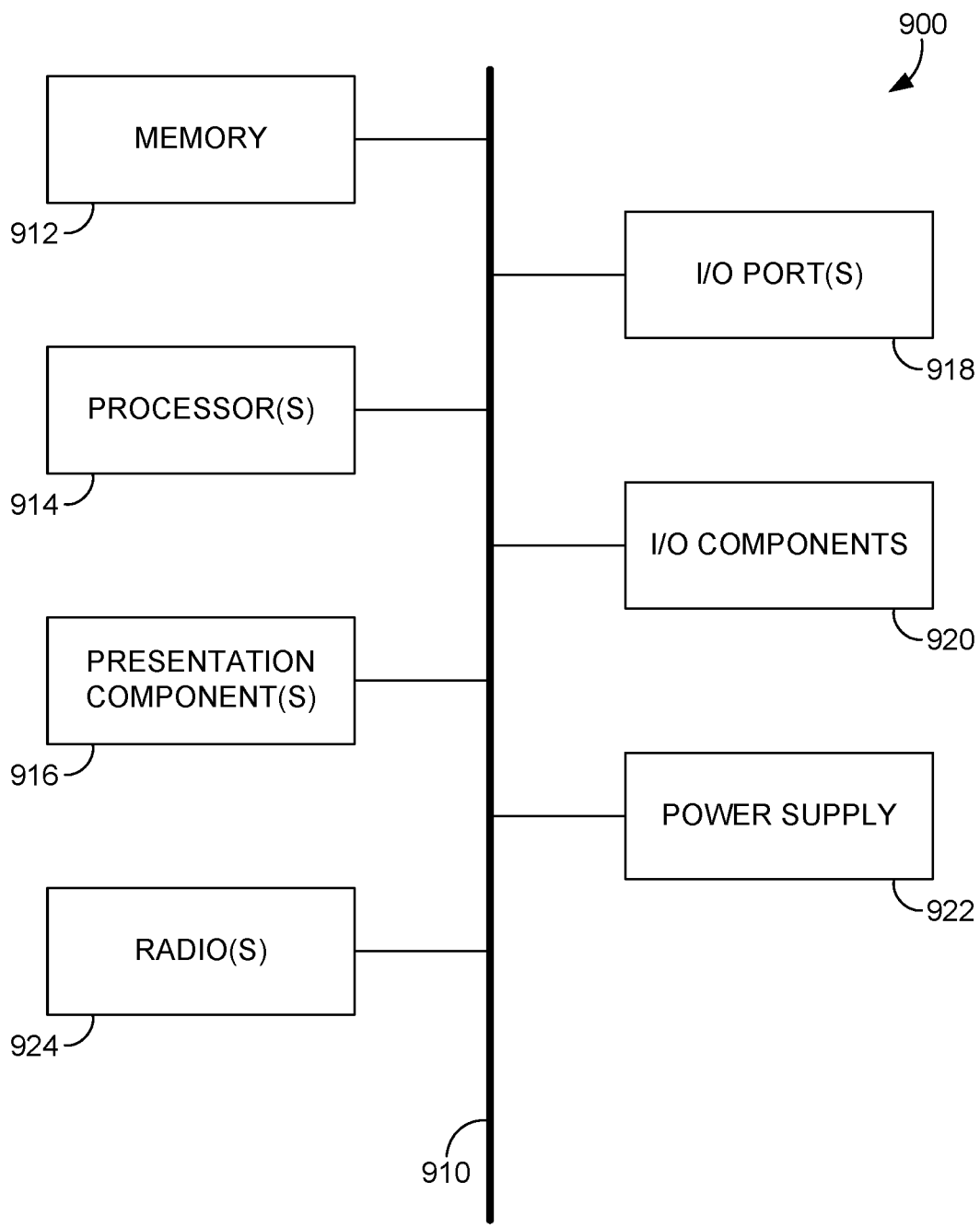
FIG. 9 is a block diagram of an example computing device in which embodiments of the present disclosure may be employed.

Having described embodiments of the present technology, FIG. 9 provides an example of a computing device in which embodiments of the present technology may be employed. Computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present invention. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for identifying suspect communications, the method comprising:
   obtaining an intrusion signature that includes at least one intrusion attribute value indicating a malicious attack on a computer network or system;
   based on the intrusion signature, generating a hierarchical signature by including each of the at least one intrusion attribute value of the intrusion signature in one of a corresponding data structure of hierarchical data structures;
   obtaining a network packet, having at least one data attribute, communicated via a network;
   identifying a data attribute value associated with a particular attribute type in the network packet;
   determining that the data attribute value matches a unique value in an array, of the hierarchical data structures, corresponding with the particular attribute type;
   in accordance with another data attribute value of the network failing to remain to be analyzed, determining that the network packet is suspect of being malicious based on the data attribute value matching the unique value in the array; and
   providing an indication of the suspect network packet.

2. The computer-implemented method of claim 1, wherein the intrusion signature is user provided based on a previously detected malicious attack.

3. The computer-implemented method of claim 1, wherein at least a portion of data structures of the hierarchical data structures include a plurality of unique values and corresponding pointers to subsequent data structures within the hierarchical data structures.

4. The computer-implemented method of claim 3, wherein the plurality of unique values are arranged in a sorted order.

5. The computer-implemented method of claim 1, wherein a first intrusion attribute value associated with a first type of intrusion attribute is included in a first corresponding data structure associated with the first type of intrusion attribute.

6. The computer-implemented method of claim 1, wherein the hierarchical data structures are organized in a plurality of levels that correspond with different types of intrusion attributes.

7. The computer-implemented method of claim 1 further comprising performing an action in association with the suspect network packet, wherein the action comprises an alert action, a modify action, a block action, and/or an allow action.

8. The computer-implemented method of claim 1, wherein a binary search algorithm is used to determine that the data attribute value matches the unique value in an array.

9. One or more non-transitory computer-readable media having a plurality of executable instructions embodied thereon, which, when executed by one or more processors, cause the one or more processors to perform a method for identifying suspect communications, the method comprising:
   obtaining an intrusion signature indicating a malicious attack on a computer network or system, the intrusion signature includes a first intrusion attribute value of a first attribute type and a second intrusion attribute value of a second attribute type;
   identifying a first intrusion attribute value from the intrusion signature;
   determining that the first intrusion attribute value fails to be included in a first array of a plurality of hierarchical arrays, the first array being associated with the first attribute type;
   based on the determination that the first intrusion attribute value fails to be included in the first array, generating a first key-value pair in association with the first intrusion attribute value and inputting the first key-value pair in a first sorted order into the first array;
   identifying a second intrusion attribute value from the intrusion signature;
   determining that the second intrusion attribute value fails to be included in a second array in the plurality of hierarchical arrays, the second array being associated with the second attribute type;
   based on the determination that the second intrusion attribute value fails to be included in the second array, generating a second key-value pair in association with the second intrusion attribute value and inputting the second key-value pair in a second sorted order into the second array; and
   based on a determination that the intrusion signature fails to include another intrusion attribute value, using the first array and the second array to detect malicious communications via a network.

10. The media of claim 9, wherein the first sorted order comprises a numerical order or an alphabetical order and the first attribute type comprises one of a source internet protocol address, a destination internet protocol address, a pattern, a source port, a destination portion, or an action.

11. The media of claim 9, wherein the first sorted order comprises a numerical order or an alphabetical order.

12. The media of claim 9, wherein the second attribute type comprises one of a source internet protocol address, a destination internet protocol address, a pattern, a source port, a destination port, or an action.

13. The media of claim 9 further comprising generating the second array corresponding with the first intrusion attribute in the first array.

14. The media of claim 9, wherein the first array includes a plurality of intrusion attribute values associated with the first attribute type and corresponding pointers to different arrays associated with the second attribute type.

15. A computing system comprising:
   one or more processors; and
   one or more non-transitory computer-readable storage media, coupled with the one or more processors, having instructions stored thereon, which, when executed by the one or more processors, cause the computing system to perform operations comprising:
   obtaining a communication having a first data attribute associated with a first attribute type and a second data attribute associated with a second attribute type, the communication being communicated via a network;
   identifying, via a first binary search, that the first data attribute matches a first unique value in a first array of a plurality of hierarchical arrays, the first array being associated with the first attribute type and including a first sorted set of attribute values;
   identifying, via a second binary search, that the second data attribute matches a second unique value in a second array of the plurality of hierarchical arrays, the second array being associated with the second attribute type and including a second sorted set of attribute values, wherein the second array corresponds with the first unique value in the first array; and based at least on the first data attribute matching the first unique value and the second data attribute matching the second unique value, determining that the communication is suspect of being malicious;

determining an action to apply to the communication based on traversing the plurality of hierarchical arrays; and implementing, using at least one of the one or more processors, the action.

16. The system of claim 15, wherein the second array is indicated as corresponding with the first unique value in the first array by including a pointer, in association with the first unique value in the first array, to the second array.

17. The system of claim 15, wherein the communication is obtained as the communication is traversing through the network.

18. The system of claim 15, wherein the first array includes a plurality of unique values associated with the first attribute type and corresponding pointers to different arrays, including the second array, associated with the second attribute type.

19. The system of claim 15, wherein the first binary search comprises assessing a median value of the first sorted set of attribute values and, based on a determination that the median value fails to match the first data attribute, assessing a lower set of values of the first sorted set of attribute values or a higher set of values of the first sorted set of attribute values based on the first data attribute.

20. The system of claim 15, wherein the action comprises a block action, an allow action, an alert action, and/or a modify action.

* * * * *